United States Patent
Prins et al.

(10) Patent No.: US 9,667,985 B1
(45) Date of Patent: *May 30, 2017

(54) SWEEP DEPENDENCY BASED GRAPHICS PROCESSING UNIT BLOCK SCHEDULING

(71) Applicant: Amazon Technologies, Inc., Reno, NV (US)

(72) Inventors: Timothy B. Prins, Hillsboro, OR (US); Jeffrey K. Lassahn, Portland, OR (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/831,121

(22) Filed: Aug. 20, 2015

Related U.S. Application Data (63) Continuation of application No. 13/721,404, filed on Dec. 20, 2012, now Pat. No. 9,172,923.

(51) Int. Cl.
| | |
|---|---|
| *H04N 7/12* | (2006.01) |
| *H04N 11/02* | (2006.01) |
| *H04N 11/04* | (2006.01) |
| *G06F 15/16* | (2006.01) |
| *H04N 19/00* | (2014.01) |
| *H04N 19/176* | (2014.01) |
| *H04B 1/66* | (2006.01) |
| *H04N 19/44* | (2014.01) |
| *H04N 19/91* | (2014.01) |
| *H04N 19/172* | (2014.01) |

(52) U.S. Cl.
CPC .......... *H04N 19/44* (2014.11); *H04N 19/172* (2014.11); *H04N 19/176* (2014.11); *H04N 19/91* (2014.11)

(58) Field of Classification Search
CPC .... H04N 19/44; H04N 19/172; H04N 19/176; H04N 19/91
USPC ...................................... 375/240.24
See application file for complete search history.

(56) References Cited

U.S. PATENT DOCUMENTS

| | | | |
|---|---|---|---|
| 2008/0056349 A1* | 3/2008 | Lyashevsky | G09G 5/363 375/240.1 |
| 2008/0162713 A1 | 7/2008 | Bowra et al. | 709/231 |
| 2009/0003447 A1 | 1/2009 | Christoffersen et al. | 375/240.16 |
| 2013/0114735 A1 | 5/2013 | Wang | 375/240.23 |

* cited by examiner

*Primary Examiner* — Hee-Yong Kim
(74) *Attorney, Agent, or Firm* — Hogan Lovells US LLP (57) ABSTRACT

An apparatus includes a central processing unit and a parallel processing unit. The parallel processing unit generally includes an array of software-configurable general purpose processors, a globally shared memory, and a shared memory. Each of the software-configurable general purpose processors in the array of software-configurable general purpose processors generally has access to the globally shared memory to execute one or more portions of a decoding program. The shared memory is accessible by the central processing unit to program the shared memory with a schedule describing which of the one or more portions of the decoding program are to be executed by each of the software-configurable general purpose processors.

20 Claims, 5 Drawing Sheets

| 0 | 1 | 2 | 4 | 6 | 9 |
|---|---|---|---|---|---|
| 3 | 5 | 7 | 10 | 12 | 15 |
| 8 | 11 | 13 | 16 | 18 | 20 |
| 14 | 17 | 19 | 21 | 22 | 23 |

SWEEP DEPENDENCY BASED GRAPHICS PROCESSING UNIT BLOCK SCHEDULING

This application relates to U.S. Ser. No. 13/721,404, filed Dec. 20, 2012, which is incorporated by reference in its entirety.

FIELD OF THE INVENTION

The present invention relates to video compression generally and, more particularly, to a method and/or architecture for sweep dependency based graphics processing unit (GPU) block scheduling.

BACKGROUND OF THE INVENTION

A basic flow of video decoding using graphics processing unit (GPU) acceleration involves (i) decoding syntax, (ii) transferring data to the GPU, (iii) assigning GPU blocks, and (iv) running the GPU blocks. Syntax decoding produces uncompressed data (such as transform coefficients, prediction modes, motion vectors, etc.) for each picture making up a video sequence. Syntax decoding can be done on a central processing unit (CPU) or some other serial processor. The uncompressed data is transferred to the GPU. GPU blocks are assigned to decode specific portions of a picture and the GPU blocks are run to decode the picture. The GPU runs multiple blocks at once. Each GPU block determines whether to wait for any neighbor pixels to be decoded. When a GPU block has to wait for neighbor pixels to be decoded, the GPU block waits on synchronization primitives to make sure the neighbor is complete before it can decode its portion of the picture.

It would be desirable to implement sweep dependency based graphics processing unit (GPU) block scheduling.

SUMMARY OF THE INVENTION

The present invention concerns an apparatus including a central processing unit and a parallel processing unit. The parallel processing unit generally includes an array of software-configurable general purpose processors, a globally shared memory, and a shared memory. Each of the software-configurable general purpose processors in the array of software-configurable general purpose processors generally has access to the globally shared memory to execute one or more portions of a decoding program. The shared memory is accessible by the central processing unit to program the shared memory with a schedule describing which of the one or more portions of the decoding program are to be executed by each of the software-configurable general purpose processors.

The objects, features and advantages of the present invention include providing a method and/or architecture for sweep dependency based graphics processing unit (GPU) block scheduling that may (i) generate a dependency map for number of blocks of an encoded picture, (ii) generate the dependency map concurrently with or separately from syntax decoding, (iii) schedule a plurality of graphics processing unit blocks based on the dependency map, (iv) run a plurality of graphics processing unit blocks in parallel to reconstruct the encoded picture, and/or (v) divide decoding tasks between a central processing unit and a parallel (e.g., graphics) processing unit.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
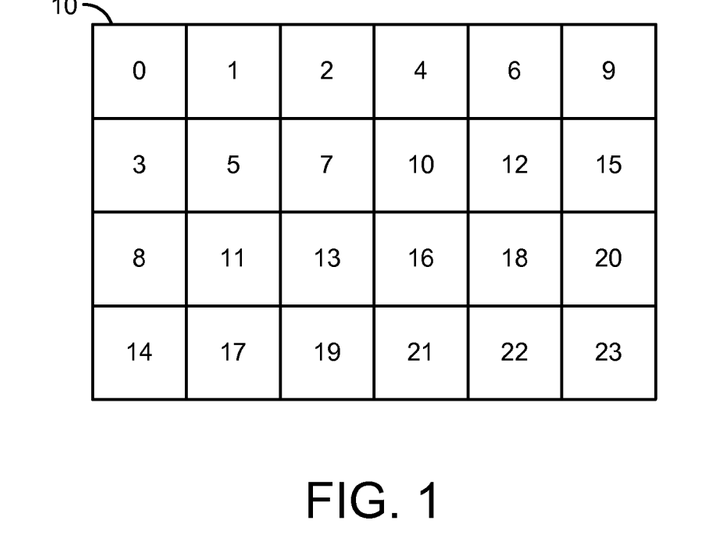
FIG. 1 is a diagram illustrating a block scheduling for a picture divided into 24 blocks.

Referring to FIG. 1, a diagram illustrating a picture 10 divided into twenty-four blocks is shown. The picture 10 may have been encoded using a standard or proprietary block-based encoding scheme or codec (encoder/decoder). For picture encoding compliant with H.264/MPEG4 AVC (Advanced Video Coding), the picture 10 is divided into units called macroblocks (MB). For picture encoding compliant with High Efficiency Video Coding (H.HEVC), the picture 10 is divided into units called code tree blocks (CTBs). High Efficiency Video Coding (HEVC) is a draft video compression standard, a successor to H.264/MPEG4 AVC (Advanced Video Coding) currently under joint development by the ISO/IEC Moving Picture Experts Group (MPEG) and ITU-T Video Coding Experts Group (VCEG) as ISO/IEC 23008-2 MPEG-H Part 2 and ITU-T H.HEVC. For decoding a High Efficiency Video Coding (HEVC) compliant encoded picture using multiple blocks of a graphics processing unit (GPU), the portions of the picture 10 decoded by each GPU block are square, have equal size, and comprise at most one code tree block (CTB). The GPU blocks need to be scheduled in some way. One method is to schedule the blocks in a diagonal pattern to try to minimize synchronization overhead. For example, using the diagonal scan pattern, the twenty-four blocks making up the picture 10 would be scheduled as indicated by the numbers in FIG. 1. The scheduling shown in FIG. 1 is chosen to accommodate worst case dependencies.

Figure 2:
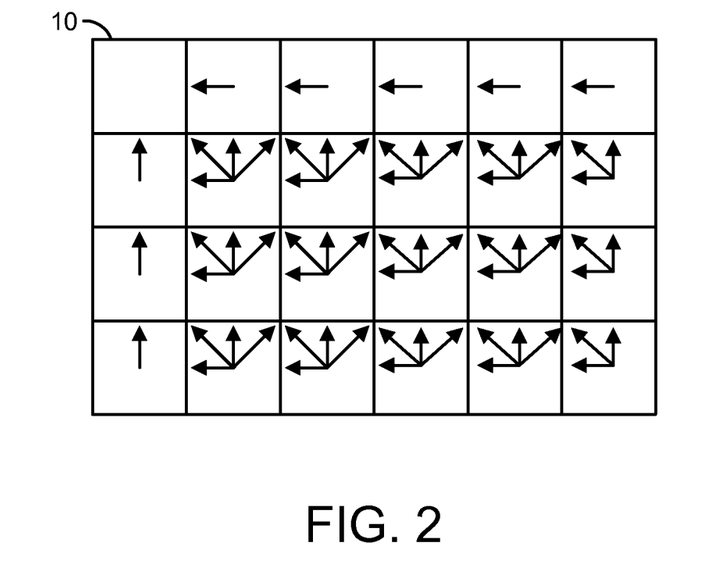
FIG. 2 is a diagram illustrating worst case dependencies between blocks.

Referring to FIG. 2, a diagram is shown illustrating the worst case dependencies associated with the blocks of the picture 10. Arrows point to blocks upon which the respective source block depends. For simplicity, the picture shown in FIG. 2 assumes (i) slices and tiles are not used and (ii) the GPU block size is the same as the image block (e.g., macroblock, code tree block, etc.) size. Similar dependency charts may be created when slice and tile features are used.

Figure 3:
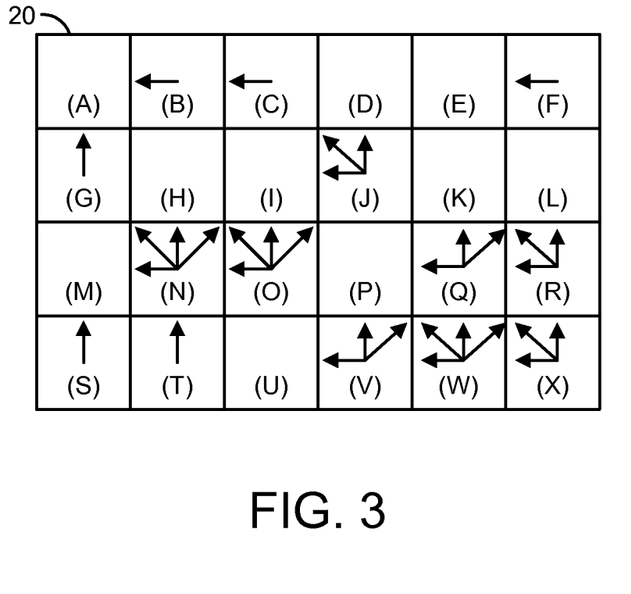
FIG. 3 is a diagram illustrating a map showing which blocks are dependent on other blocks for a GPU that can run 6 blocks in parallel.

The diagonal method of scheduling does not take into account that generally not all possible dependencies actually exist. Thus, situations can arise where there are many GPU blocks waiting on other GPU blocks to complete, and at the same time other GPU blocks are waiting in a queue for one of the running GPU blocks to complete. For example, given a GPU that can run 6 blocks in parallel, a map may be created showing which blocks are dependent on other blocks (e.g., per the video coding specification). Referring to FIG. 3, a dependency map 20 for a GPU capable of running six blocks in parallel is illustrated, where blocks are labeled with letters.

The dependency map 20 may be used to show how the work would be scheduled on the GPU. An example of how the blocks of the map 20 would be scheduled on the GPU may be illustrated using the following TABLE 1:

TABLE 1

| Time | Running, doing useful work | Running, waiting on another block to complete | Waiting to run | Completed |
| --- | --- | --- | --- | --- |
| 0 | | | a, b, c, g, d, h, e, i, m, f, j, n, k, o, s, l, p, t, q, u, r, v, w, x | |
| 1 | a, d, h | b, c, g | e, i, m, f, j, n, k, o, s, l, p, t, q, u, r, v, w, x | |
| 2 | b, g, e, i, m | c, | f, j, n, k, o, s, l, p, t, q, u, r, v, w, x | a, d, h, |
| 3 | c, f, n, k | j, o, | s, l, p, t, q, u, r, v, w, x | a, d, h, b, g, e, i, m |
| 4 | j, o, s, p, l, t | | q, u, r, v, w, x | a, d, h, b, g, e, i, m, c, f, n, k |
| 5 | q, u, | r, v, w, x | | a, d, h, b, g, e, i, m, c, f, n, k, j, o, s, p, l, t |
| 6 | r, v | w, x | | a, d, h, b, g, e, i, m, c, f, n, k, j, o, s, p, l, t, q, u |
| 7 | w | x | | a, d, h, b, g, e, i, m, c, f, n, k, j, o, s, p, l, t, q, u, r, v |
| 8 | x | | | a, d, h, b, g, e, i, m, c, f, n, k, j, o, s, p, l, t, q, u, r, v, w |
| 9 | | | | a, d, h, b, g, e, i, m, c, f, n, k, j, o, s, p, l, t, q, u, r, v, w, x |

TABLE 1 generally reflects scheduling work on the GPU assuming the GPU can run six blocks at once and the standard diagonal scheduling is used. In the above example, there are eight rounds of GPU blocks running, for a total of forty-eight possible blocks that could be run. However, thirteen of the blocks are spent idle waiting for neighbor blocks to be ready, eleven are spent at the end when there is no longer work to fill the GPU, and only twenty-four blocks are used for actual work. For the above example using the diagonal scheduling technique the efficiency of GPU utilization is only 50%.

The scheduling of the GPU blocks may be improved by creating a dependency map (e.g., using the CPU). The dependency map is created by determining which other blocks depend on each block. The blocks may then be numbered according to the following rules:

1. If a block does not depend on any neighbors, the block is numbered '0'.
2. If a block depends on any of its neighbors, the block is numbered one more than the neighbor with the greatest number.

Figure 4:
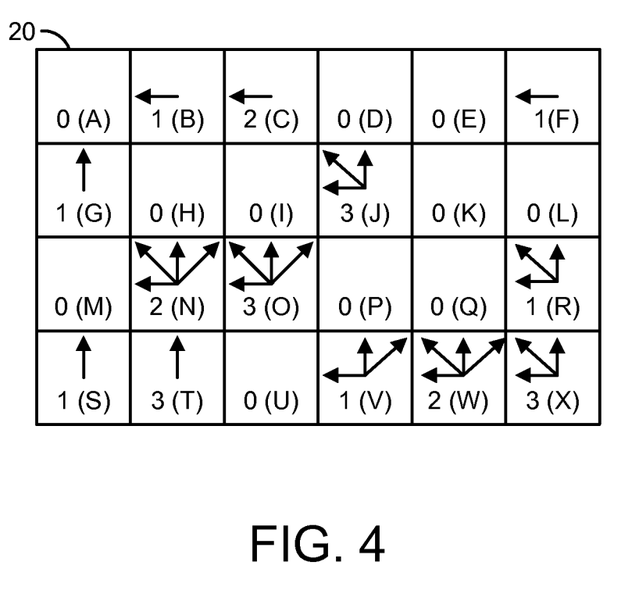
FIG. 4 is a diagram illustrating a map showing which blocks are dependent on other blocks for a GPU with blocks scheduled in accordance with an embodiment of the present invention.

Referring to FIG. 4, a diagram is shown illustrating an application of the above rules to the map 20 of FIG. 3.

Once the dependency map has been created, a schedule may be generated. In one example, the schedule may be created as follows:

1. Perform a raster scan of the blocks.
2. Sort the blocks by the respective dependency number. When multiple blocks have the same number, the blocks are ordered in raster order. Using the example illustrated in FIG. 4, the sorting of the blocks may result in a schedule as illustrated in the following TABLE 2:

TABLE 2

| Time | Running, doing useful work | Running, waiting on another block to complete | Waiting to run | Completed |
| --- | --- | --- | --- | --- |
| 0 | | | a, d, e, h, i, k, l, m, p, q, u, b, f, g, r, s, v, c, n, w, j, o, t, x | |
| 1 | a, d, e, h, i, k | | l, m, p, q, u, b, f, g, r, s, v, c, n, w, j, o, t, x | |
| 2 | l, m, p, q, u, b | | f, g, r, s, v, c, n, w, j, o, t, x | a, d, e, h, i, k |
| 3 | f, g, r, s, v, c | | n, w, j, o, t, x | a, d, e, h, i, k, l, m, p, q, u, b |
| 4 | n, w, j | o, t, x | | a, d, e, h, i, k, l, m, p, q, u, b, f, g, r, s, v, c |
| 5 | o, t, x | | | a, d, e, h, i, k, l, m, p, q, u |

TABLE 2-continued

| Time | Running, doing useful work | Running, waiting on another block to complete | Waiting to run | Completed |
|------|---------|---------|---------|---------|
| 6 | | | | b, f, g, r, s, v, c, n, w, j<br>a, d, e, h, i, k, l, m, p, q, u,<br>b, f, g, r, s, v, c, n, w, j, o, t, x |

TABLE 2 illustrates an example scheduling of work on the GPU assuming the GPU can run 6 blocks at once and the scheduling method in accordance with an embodiment of the invention is used.

With the improved scheduling, there are only five rounds of GPU blocks running, for a total of thirty possible blocks that could be run. Only three of the blocks (e.g., o, t, x) are spent idle waiting for neighbor blocks to be ready and the three blocks are spent at the end when there is no longer work to fill the GPU. This translates to an efficiency of 80%. A similar technique can be applied when slices and/or tiles are used. To further enable parallelism when multiple slices and tiles are used, the blocks from different slices and tiles may be interleaved. The scheduling technique in accordance with an embodiment of the present invention allows greater throughput on the GPU by reducing the synchronization overhead and the number of blocks stalled waiting for other blocks to complete. The method of sorting the blocks may vary. For example, different heuristics may be used, and may include using the number of GPU blocks the GPU can handle at once.

Figure 5:
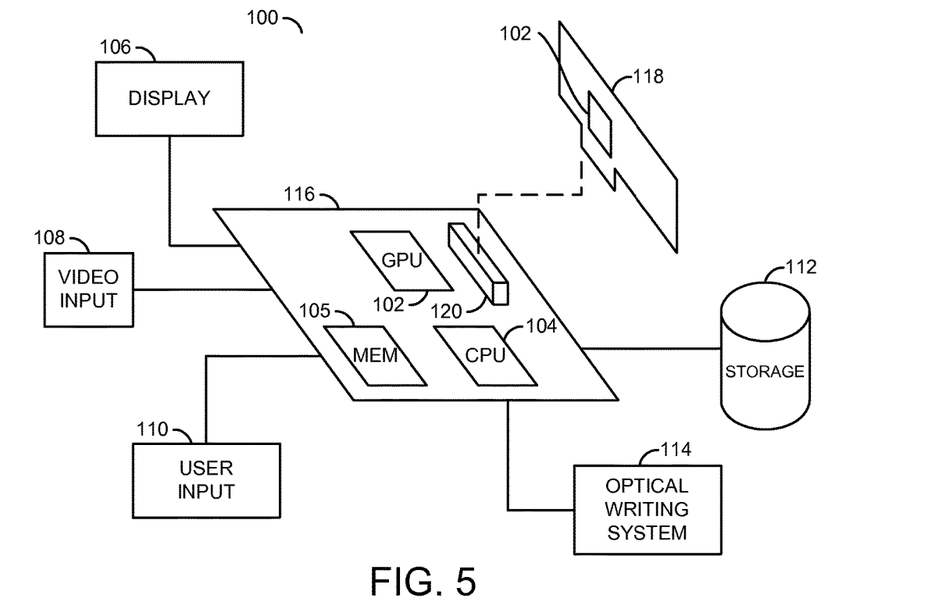
FIG. 5 is a block diagram illustrating a system for implementing an encoder in accordance with an example embodiment of the present invention.

Referring to FIG. 5, a block diagram of a system 100 is shown illustrating a context for implementing a decoder in accordance with an embodiment of the present invention. In one example, an embodiment of the present invention may be implemented as a computer system 100 including both a parallel (e.g., graphics) processing unit (GPU) 102 and a central processing unit (CPU) 104. The system 100 may also include, but is not limited to, a system memory 105, an output device (e.g., display, monitor, etc.) 106, a video input module 108, an user input device (e.g., keyboard, mouse, etc.) 110, a storage device (e.g., hard drive, non-volatile memory, etc.) 112 and an optical disc writing system 114. In another example, an embodiment of the present invention may implement a method for decompressing video frames from an encoded (e.g., H.264, H.HEVC, etc.) bitstream using (i) a parallel (e.g., graphics) processing unit that includes many parallel stream processors configured in an array and (ii) a CPU to perform some of the steps (e.g., entropy/syntax decoding, etc.) in the decompression.

The GPU 102 may be implemented, in one example, as a device (e.g., from NVIDIA, AND, INTEL, etc.) mounted either on a motherboard 116 or on a card 118 that connects to the motherboard 116 (e.g., via a connector 120). The GPU 102 may comprise, in one example, a plurality of software-programmable general purpose parallel processors on one device. The GPU 102 may be configured to process data in parallel using the plurality of software-programmable general purpose parallel processors. The CPU 104 may be implemented as one or more sequential processors (or cores) mounted on the motherboard 116 (e.g., via a socket). A decoder (e.g., H.264, H.HEVC, etc.) instance may be implemented that takes advantage of the parallel processors and the sequential processors by efficiently partitioning the decoder instance across the processor sets.

Figure 6:
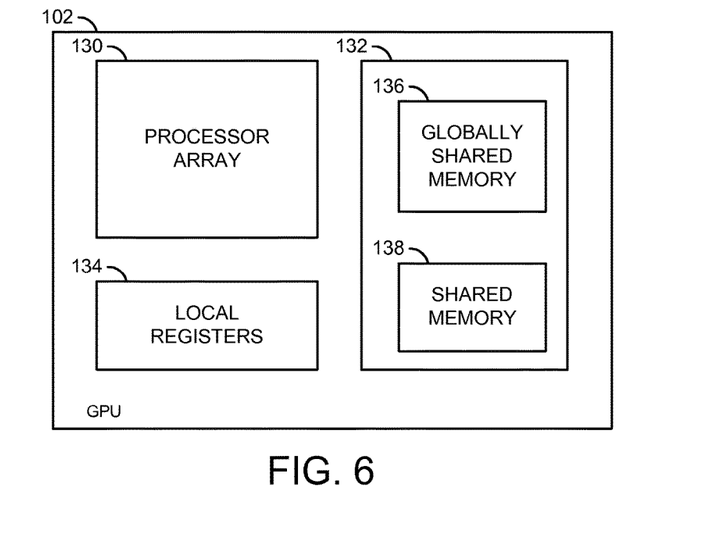
FIG. 6 is a diagram illustrating an example embodiment of a GPU of FIG. 5.

Referring to FIG. 6, a diagram is shown illustrating an example of a GPU 102 in accordance with an embodiment of the present invention. In one example, the GPU 102 may comprise an array of software-programmable general purpose parallel processors 130, a memory 132, and a plurality of local registers 134. The memory 132 may comprise a first portion 136 and a second portion 138. The portion 136 may implement a globally shared memory. The portion 138 may implement a shared memory. The shared memory 138 is generally implemented with faster memory than the globally shared memory 136. Each of the processors in the parallel processor array 130 may have access to the globally shared memory 136, a portion of the shared memory 136 and a number of the local registers 134. In one example, a subset (or block) of the processors in the parallel processor array 130 (e.g., 8) may share a respective portion of the shared memory 138. In general, the GPU 102 may be configured to efficiently carry out the same computation on parallel data sets. The CPU 104 may be configured to provide serial processing where serial computations are completed very quickly. In one example, the CPU 104 may be configured to decode syntax elements of a picture contained in an encoded bitstream, generate a dependency map for blocks (e.g., of coefficients) of the picture, and generate a schedule for processing the blocks in parallel on the GPU 102.

In one example, the GPU 102 may be implemented with an NVIDIA device. A general purpose parallel computing architecture such as NVIDIA® CUDA™ may be used to leverage the parallel compute engine in the NVIDIA GPU to solve many complex computational problems in a fraction of the time taken on a CPU. NVIDIA and CUDA are trademarks of NVIDIA Corporation, 2701 San Tomas Expressway, Santa Clara, Calif. 95050. The general purpose parallel computing architecture may include a CUDA™ Instruction Set Architecture (ISA) and the parallel compute engine in the GPU. To program to the CUDA™ architecture, a developer may, for example, use C, one of the most widely used high-level programming languages, which can then be run on a CUDA™ enabled processor. Other languages may be supported in the future, including FORTRAN and C++.

A GPU program may be referred to as a "Kernel". A GPU implemented with the NVIDIA device may be configured in 1 or 2 dimensional blocks of threads called CUDA blocks. The CUDA blocks may be configured in a grid of CUDA blocks when a kernel is launched. Three resources may be optimized for any given launch of a kernel: number of registers used, number of threads per block, and amount of shared memory used for each CUDA Referring to FIG. 7, a diagram is shown illustrating a system in accordance with an embodiment of the present invention. In various embodiments of the present invention, an architecture 200 may comprise a sequential processor array (SPA) 201 and a parallel processor array (PPA) 202. The SPA 201 may contain one or more high performance general purpose sequential processing units 203 that are designed to execute sequential instructions on sequential data. The PPA 202 may contain one or more groups of homogeneous general purpose SIMD (Single Instruction Multiple Data) multiprocessors 204 that are designed to operate on highly parallel problems where many processors can work in parallel. The SPA 201 and PPA 202 each have access to one or more physical random access memories (RAMS) 205 and 206, respectively, and may be connected together (e.g., via a high speed bi-directional data and communication bus 207).

Figure 7:
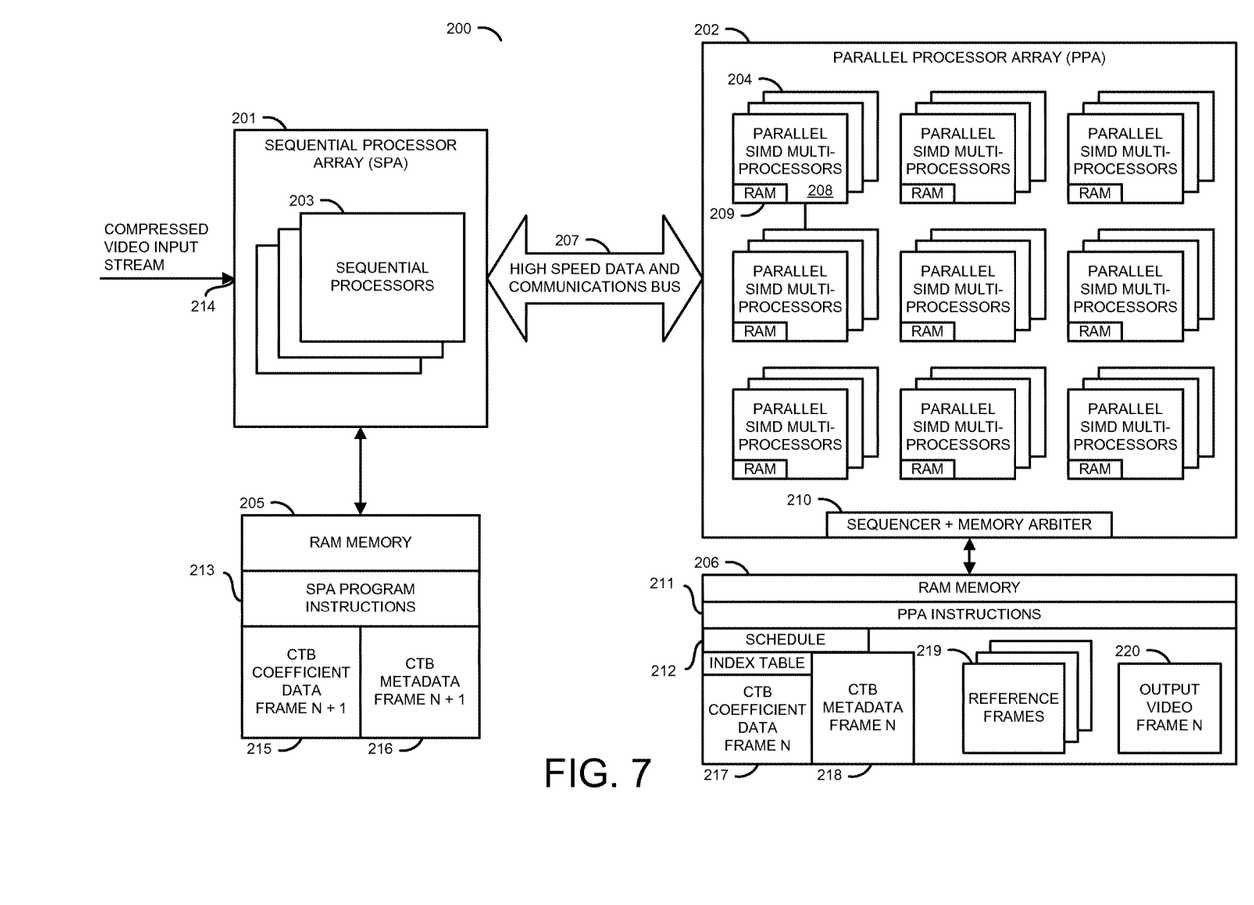
FIG. 7 is a diagram illustrating a multi-processor video decompression/compression system architecture in accordance with an embodiment of the invention.

Each multiprocessor 204 may contain one or more SIMD (Single Instruction Multiple Data) processors 208, and also may contain a memory cache (illustrated as RAM but may be other types of cache) 209. The memory cache 209 generally allows fast access and communication between each SIMD processor 208 in the multiprocessor 204. The random access memory (RAM) 206 is generally shared by all the multiprocessors 204 in the array 202. The random access memory (RAM) 206 may be configured to store video frames, block coefficient data, block metadata, scheduling information, and multiprocessor instructions. A PPA sequencer and memory arbiter 210 may be configured to automatically and efficiently select processors in the array 202 to execute a set of instructions 211 stored in the memory 206. The processors in the array 202 may be configured to execute the set of instructions 211 based upon a schedule 212 also stored in the memory 206. Each multiprocessor 204 may process batches of instructions 211. In one example, one batch may be executed after another. The PPA sequencer and memory arbiter 210 selects batches of instructions 211 for each multiprocessor 204. If, and when, a multiprocessor 204 is instructed to wait for memory or a synchronization event, the PPA sequencer and memory arbiter 210 may be configured to swap in new instructions to execute on that multiprocessor 204.

The processors 203 are generally controlled using program instructions 213 stored in the memory 205. Compressed video 214 is syntax decoded by the SPA 201, using one or more sequential processors 203. Syntax decoding of the compressed video 214 creates block coefficient data 215 and block metadata 216. After the syntax decoding is finished, a sequential processor 203 scans the block metadata 216 and creates a dependency map. In some embodiments, the dependency map is created at the same time as syntax decode. A sequential processor 203 then sorts the dependency information, creating the schedule 212 for block scheduling. The schedule 212, block metadata 216, and transform coefficients 214 are transferred to the PPA 202 using the high speed data bus 207. The transferred transform coefficients 214 and block metadata 216 are stored in memory 217 and 218, respectively.

Blocks are then run on the multiprocessors 204, as launched by the sequencer and memory arbiter 210. Each block that is launched on a multiprocessor 204 looks at the schedule 212 created by the sequential processor array 201. The blocks read in transform coefficients and block metadata from memories 217 and 218 using the sequencer and memory arbiter 210. The transform coefficients and block metadata are stored temporarily in local memory 209. The blocks then decompress the data (e.g., using one or more reference frames 219 stored in the memory 206). If a block needs to wait for data from neighbor blocks, the block waits on a synchronization primitive (e.g. continuing checking memory 206 to see if a block has indicated it is finished). When the block is finished, the block writes the reconstructed data to memory 220 and writes metadata to indicate it is finished.

Figure 8:
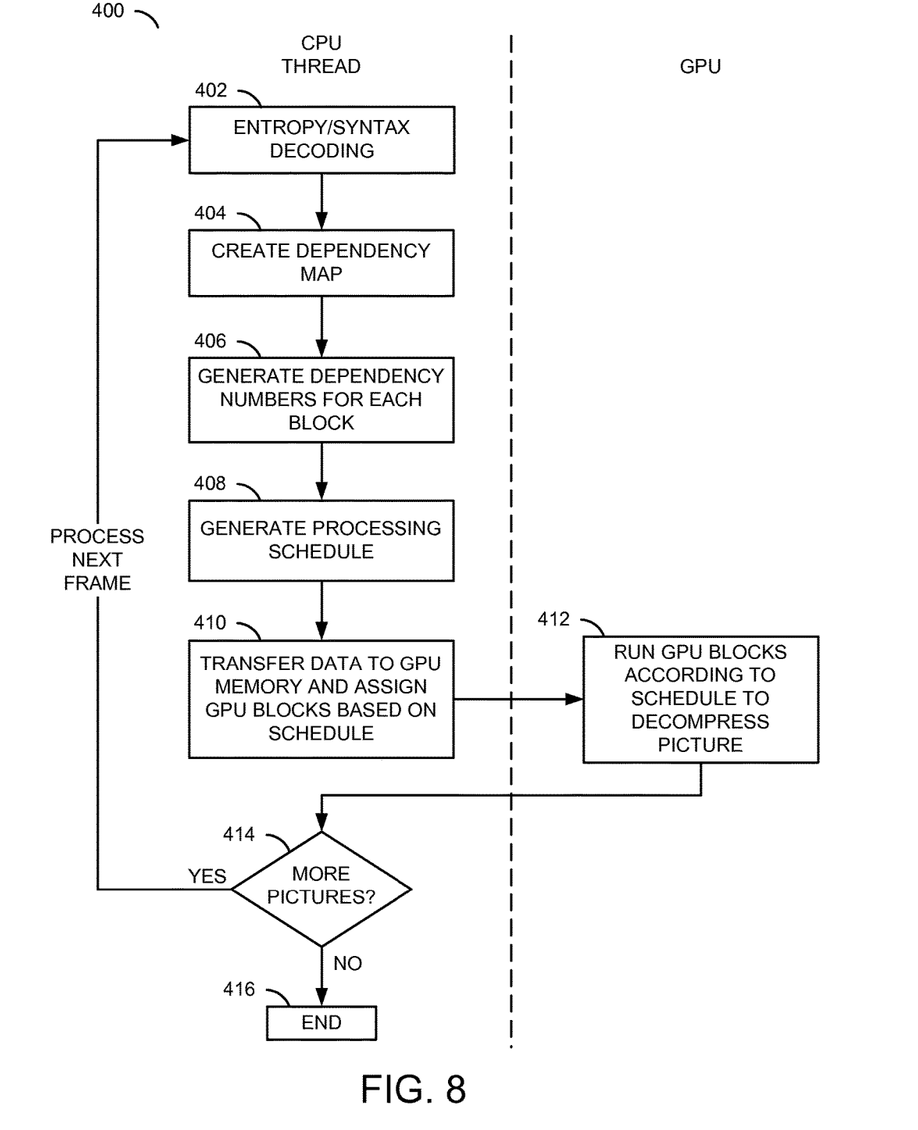
FIG. 8 is a flow diagram illustrating an example partition of a decoder functionality across sets of parallel and serial processors in accordance with an embodiment of the invention.

Referring to FIG. 8, a flow diagram is shown illustrating an example decoding process 400 in accordance with an embodiment of the present invention. In one example, the process (or method) 400 may implement a block-based decoder using multiple GPU and CPU threads. The block-based decoder may be compliant with one or more standard and/or proprietary codecs (e.g., H.264, H.HEVC, etc.). In some embodiments, the process 400 may comprise a step (or state) 402, a step (or state) 404, a step (or state) 406, a step (or state) 408, a step (or state) 410, a step (or state) 412, a step (or state) 414, and a step (or state) 416. Each of the steps 402-416 may be implemented as a step, a process, a subroutine, a state in a state machine/diagram, or another type of step/state and/or process and/or state.

The process 400 generally begins processing a first slice, tile, picture, etc. in the step 402. In one example, a slice may be equivalent to one picture. However, slices and/or tiles representing other portions of a picture may be processed accordingly to meet the design criteria of a particular implementation. In the step 402, the process 400 performs entropy/syntax decoding. In the step 404, the process 400 creates a dependency map for a picture to be processed (reconstructed). In one example, the steps 402 and 404 may be performed as separate passes (e.g., sequentially in a single CPU thread). In another example, the steps 402 and 404 may be performed concurrently (e.g., in separate CPU threads). When the dependency map has been created, the process 400 moves to the step 406. In the step 406, the process 400 determines dependency numbers for each block of the dependency map based upon a set of predefined rules. When all of the blocks have been assigned dependency numbers, the process 400 may move to the step 408. In the step 408, the process 400 generates a processing schedule that determines the manner in which the blocks will be processed by the GPU. When the processing schedule has been generated, the process 400 moves to the step 410.

In the step 410, the process 400 transfers data, program instructions, and block processing schedule information to the GPU. When the data, program instructions, and block processing schedule information has been transferred to the GPU, the process 400 moves to the step 412. In the step 412, the GPU assigns blocks of one or more processors (GPU blocks) based upon the processing schedule information (e.g., the processing schedule generated in step 408) and begins running the GPU blocks according to the schedule to decompress (reconstruct) the compressed picture. While the GPU is running the GPU blocks, the process 400 may move to the step 414, where a check is perform to determine whether there are more pictures to reconstruct. If there are more pictures, the process 400 moves to the step 402 (or the step 404 if the step 402 is implemented in a separate CPU thread) to begin creating a dependency map for the next picture. If there are no more pictures, the process 400 moves to the step 416 and terminates.

The functions performed by the various kernels, subroutines, programs, processes, steps, etc. described above and illustrated in the diagram of FIG. 6 may be implemented using a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), graphics processing unit (GPU), video digital signal processor (VDSP)

and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a central processing unit configured to generate a schedule in response to (a) performing a raster scan of blocks of an input frame, (b) sorting said blocks by a respective dependency number and (c) ordering said blocks according to said respective dependency numbers; and
   a parallel processing unit comprising
      an array of software-configurable general purpose processors,
      a globally shared memory, wherein each of the software-configurable general purpose processor in said array of software-configurable general purpose processors has access to said globally shared memory to execute one of more portions of decoding program, and
      a shared memory, wherein (i) said shared memory is accessible by said central processing unit to program said shared memory with said schedule and (ii) said schedule describes which of said one of more portions of said decoding program are to be executed by each of said software-configurable general purpose processors.

2. The apparatus according to claim 1, wherein said decoding program when executed by said parallel processing unit reconstructs a current frame using one of more reference frames, and said current frame and said one or more reference frames are stored in said globally shared memory.

3. The apparatus according to claim 1, wherein the array of software-configurable general purpose processors is part of a graphics processing unit.

4. The apparatus according to claim 1, wherein the decoding program is configured to decode pictures in compliance with at least one or more standard codecs and proprietary codecs.

5. The apparatus according to claim 4, wherein said one or more standard codecs and proprietary codecs comprise one or more of H.264, H.264(AVC), and High Efficiency Video Coding (HEVC).

6. The apparatus according to claim 1, wherein said central processing unit recovers transform coefficients and metadata for said input frame by entropy and syntax decoding an encoded bitstream.

7. The apparatus according to claim 1, wherein said array of software-configurable general purpose processors comprises a plurality of general purpose parallel stream processors configured in an array of processing blocks.

8. The apparatus according to claim 7, wherein each of said processing blocks in said array of processing blocks is assigned according to said schedule to decode a respective one of said blocks of said input frame.

9. The apparatus according to claim 8, wherein each respective one of said blocks of said input frame comprises a code tree block.

10. The apparatus according to claim 7, wherein each of said parallel stream processors comprises one or more single instruction multiple data (SIMD) processors.

11. A method of decoding a picture communicated in an encoded bitstream comprising the steps of:
   generating scheduling instructions based on a block ordering of blocks of said picture obtained by
      performing a raster scan of blocks of picture,
      sorting the blocks of the picture by respective dependency numbers, and
      ordering the blocks of the picture according to the respective dependency numbers; and
   processing a number of said blocks in parallel using an array of soft-configurable general purpose parallel processors using said scheduling instructions.

12. The method according to claim 11, wherein the picture is communicated in a block-based encoded bitstream.

13. The method according to claim 12, wherein the block-based encoded bitstream comprises a High Efficiency Video Coding (HEVC) compliant encoded bitstream.

14. The apparatus according to claim 1, wherein said respective dependency number is zero if a respective one of said blocks does not depend on any neighboring blocks.

15. The apparatus according to claim 1, wherein said respective dependency number of a respective one of said blocks is numbered one more than a dependency number of a neighboring block with a highest dependency number if said respective one of said blocks does depend on any neighboring blocks.

16. The apparatus according to claim 1, wherein said respective dependency number of said blocks are ordered based on a raster order if a subset of said blocks have the same dependency number.

17. The apparatus according to claim 1, wherein said schedule is configured to allow greater throughput on said parallel processing unit by reducing a synchronization overhead and a number of said blocks stalled waiting for other blocks on which said blocks depend.

18. The apparatus according to claim 1, wherein said shared memory is a faster type of memory than said globally shared memory.

19. The apparatus according to claim 1, wherein said central processing unit generates a dependency map indicating which of said blocks of said input frame depend on other blocks of said input frame and said schedule is generated based on said dependency map.

20. The method according to claim 11, further comprising:
- decoding syntax elements representing a picture in said encoded bitstream using a central processing unit;
- generating a dependency map for a plurality of blocks of said picture; and
- assigning the respective dependency numbers to each block of said picture.

* * * * *